Oct. 28, 1958 W. WALDHERR 2,858,053
DISPENSING DEVICE
Filed March 27, 1956 7 Sheets-Sheet 1

Inventor:
Wilhelm Waldherr
by Michael S. Striker

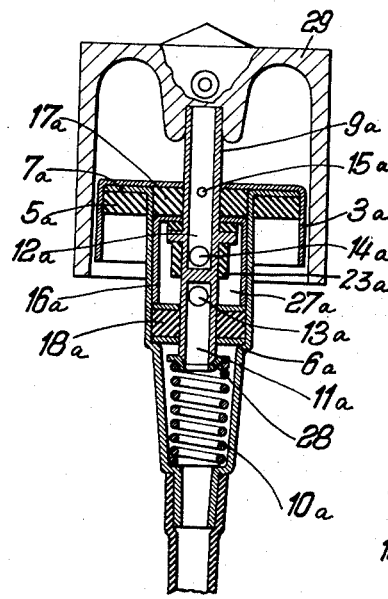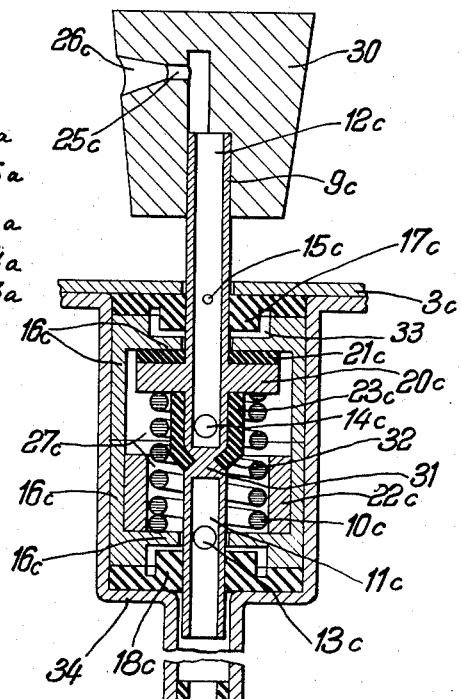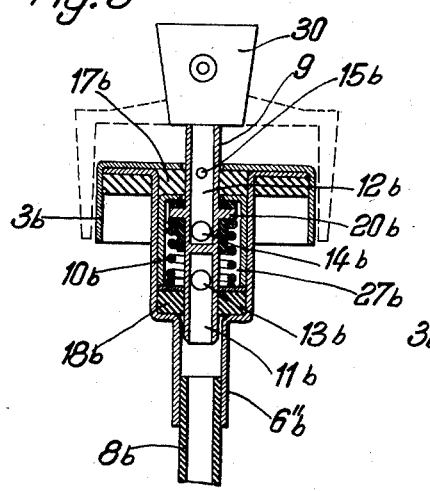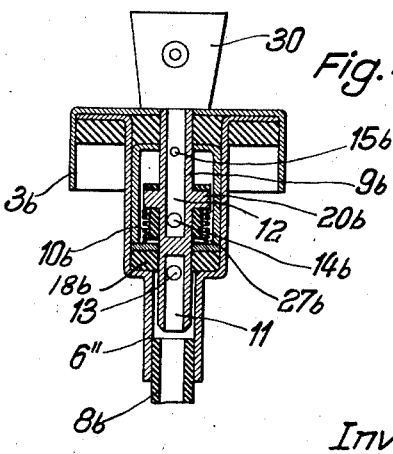

Oct. 28, 1958 W. WALDHERR 2,858,053
DISPENSING DEVICE
Filed March 27, 1956 7 Sheets-Sheet 3

Inventor:
Wilhelm Waldherr
By: Michael S. Striker
Agt.

Oct. 28, 1958
W. WALDHERR
2,858,053
DISPENSING DEVICE
Filed March 27, 1956
7 Sheets-Sheet 4
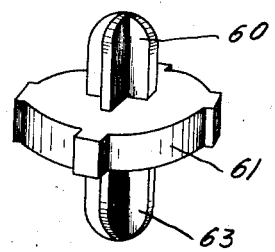
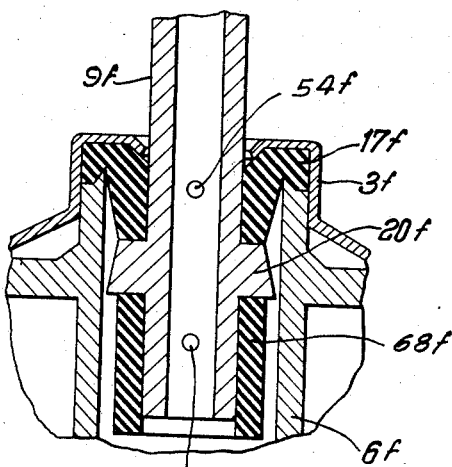
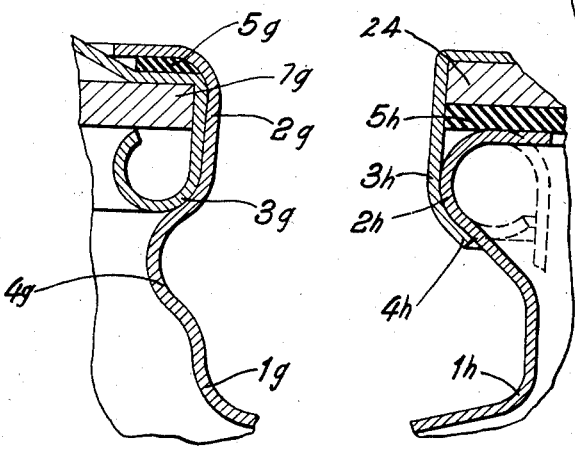
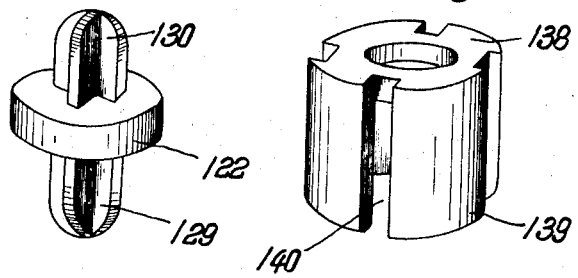
Inventor:
Wilhelm Waldherr
By: Michael S. Striker
agt.

Oct. 28, 1958 W. WALDHERR 2,858,053
DISPENSING DEVICE
Filed March 27, 1956 7 Sheets-Sheet 5

Inventor:
Wilhelm Waldherr
by: Michael S. Striker

Oct. 28, 1958   W. WALDHERR   2,858,053
DISPENSING DEVICE
Filed March 27, 1956   7 Sheets-Sheet 6

Inventor:
Wilhelm Waldherr
by Michael S. Striker
agt.

United States Patent Office 2,858,053
Patented Oct. 28, 1958

2,858,053
DISPENSING DEVICE

Wilhelm Waldherr, Mannheim, Germany

Application March 27, 1956, Serial No. 574,251

Claims priority, application Germany
November 21, 1955

12 Claims. (Cl. 222—394)

The present invention relates to dispensing devices.

More particularly, the present invention relates to a dispensing device which is adapted to dispense a fluid under pressure.

In known dispensing devices which are operated to spray a fluid from the interior of the container where the fluid is held under pressure, it is exceedingly difficult to control the amount of fluid which is dispensed. Where the fluid is quite expensive and if only an extremely small amount is desired to be sprayed, it is almost impossible to prevent spraying of more than the desired amount of fluid. Furthermore, it is unavoidable that a certain residual amount of fluid remains in the container and cannot be sprayed therefrom, and furthermore it is extremely difficult to fill the container with the fluid under pressure. Moreover, the known structures for dispensing such a fluid from a container are exceedingly complicated and expensive and do not operate reliably.

One of the objects of the present invention is to provide a dispensing device of the above type with a means for guaranteeing that only a predetermined amount of fluid is dispensed when the device is operated.

Another object of the present invention is to provide an arrangement where the amount of fluid dispensed during one operation can be controlled.

A further object of the present invention is to provide an arrangement which guarantees that all of the fluid in the container is dispensed.

An additional object of the present invention is to provide an arrangement where the container may be conveniently filled with the fluid under pressure.

Also, the objects of the present invention include the provision of a dispensing device which is composed of relatively simple and ruggedly constructed elements which operate reliably and which may be conveniently joined to a container for the fluid under pressure at no great expense and in a very efficient manner.

With the above objects in view the present invention mainly consists of a dispensing device for dispensing a fluid, this device including a container adapted to hold a fluid under pressure. A metering chamber means is carried by and closes the container and has a metering chamber in its interior. A manually operable means is movably carried by the metering chamber means for movement between a filling position placing the interior of the metering chamber in communication with the interior of the container and out of communication with the outer atmosphere and a dispensing position placing the metering chamber in communication with the outer atmosphere and out of communication with the interior of the container, so that the metering chamber is filled with fluid from the container when the manually operable means is in its filling position and so that only the fluid in the metering chamber discharges to the outer atmosphere when the manually operable means is in its dispensing position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 shows a different embodiment of the structure of the invention which is attached to the container;

Fig. 3 shows still another embodiment of the dispensing structure of the invention which is connected to the container;

Fig. 4 shows the structure of Fig. 3 in a different position;

Fig. 5 is a sectional elevational view of still another embodiment of a structure according to the present invention adapted to be attached to the container which holds the fluid under presusre which is to be dispensed;

Figure 6:
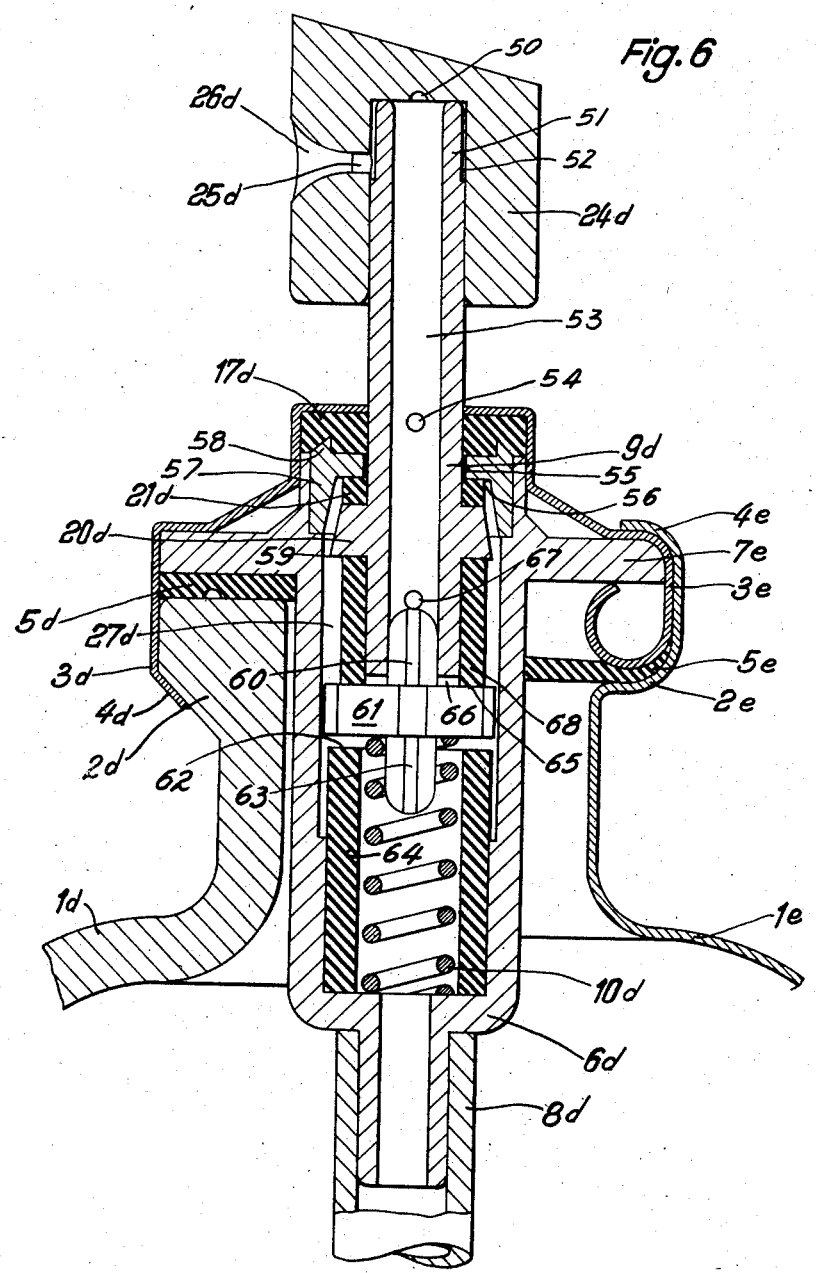
Figure 10:
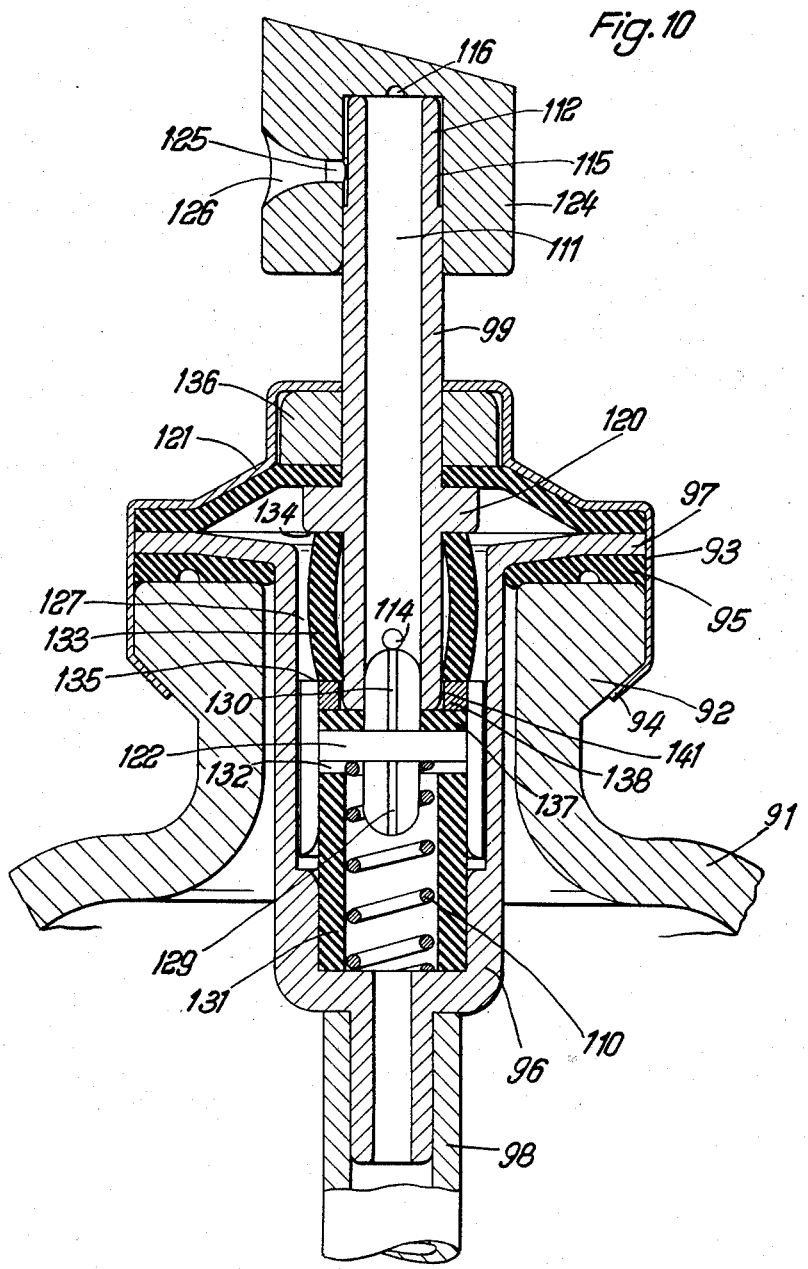
Figure 13:
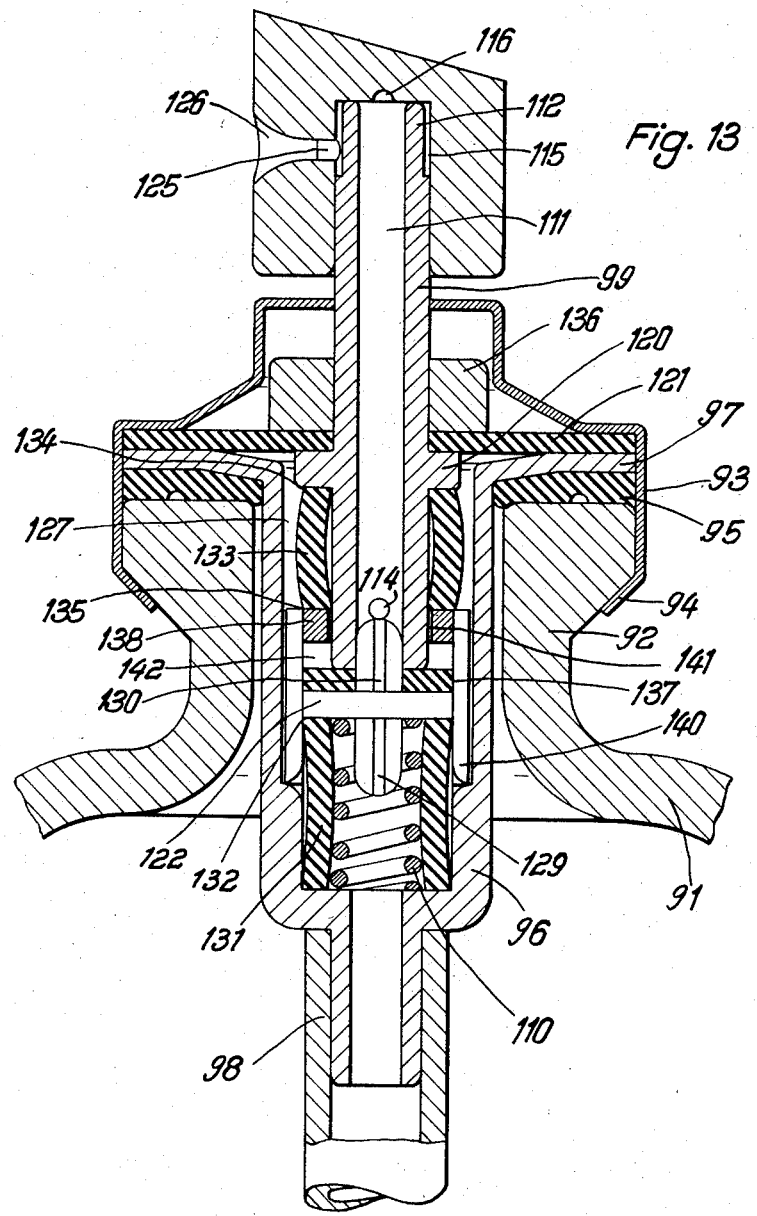

Fig. 6 is a fragmentary sectional elevational view showing still another embodiment of a structure according to the present invention for dispensing fluid from a container, the structure shown at thte right of the vertical central line of Fig. 6 illustrating one type of container and means for connecting the same to the dispensing structure of the invention and the structure of Fig. 6 to the left of the central line thereof showing another type of container and means for connecting the same to the structure of the invention;

Fig. 7 is a perspective view of a flow control element used in the embodiment of Fig. 6;

Fig. 8 is a fragmentary sectional elevational view of a variation of part of the movable valve structure of the invention;

Fig. 9 fragmentarily and sectionally illustrates one embodiment of an arrangement for joining a container to a dispensing structure;

Fig. 9A shows another embodiment of an arrangement for connecting a dispensing structure with a container, Fig. 9A showing in dotted lines still another variation;

Fig. 10 is a fragmentary sectional elevational view of still another embodiment of a dispensing device according to the present invention;

Fig. 11 is a perspective view of one of the flow controlling elements used in the embodiment of Fig. 10;

Fig. 12 is a perspective view of another element used in the embodiment of Fig. 10;

Fig. 13 shows the structure of Fig. 10 in another position thereof; and

Figure 14:
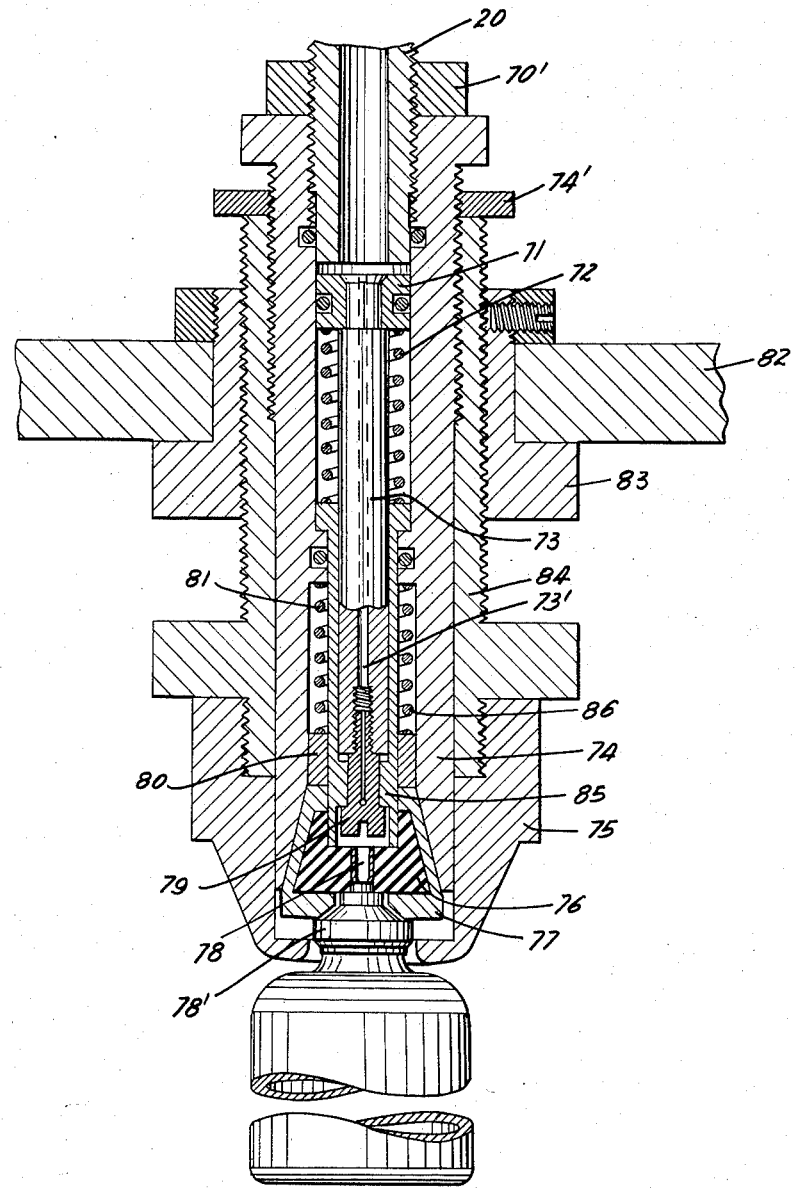

Fig. 14 illustrates one possible embodiment of a device for filling a container having a dispensing device according to the present invention.

Figure 1:
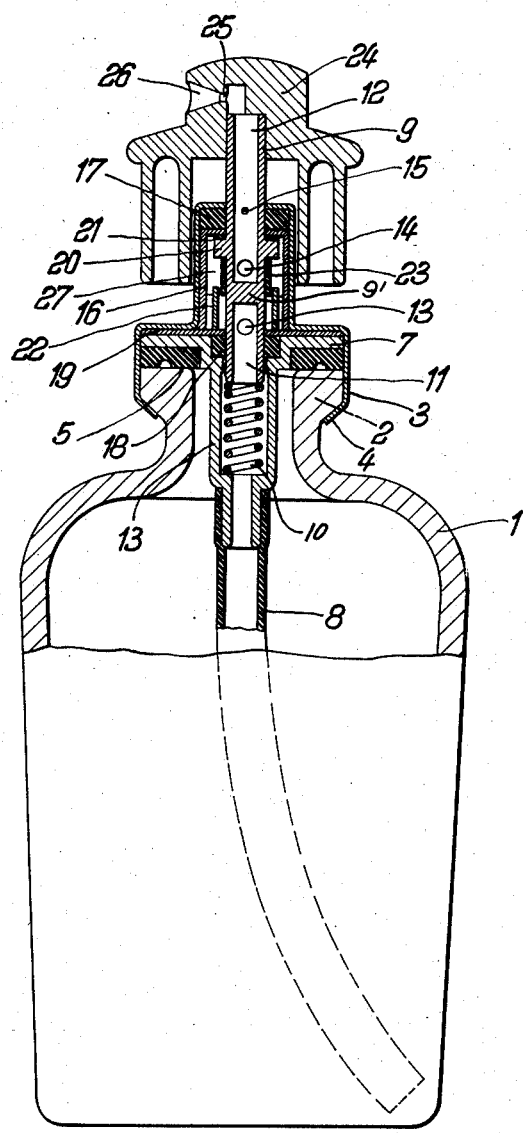
Fig. 1 is a partly sectional elevational view of one embodiment of a dispensing device according to the present invention.

Referring now to the drawings and to Fig. 1 in particular, it will be seen that a container 1 is provided to hold the fluid under pressure which is to be dispensed. This container 1 may be made of glass and has an open top. The open top portion of the neck of the container 1 is provided with an outwardly extending flange 2, and the dispensing structure is connected to the top of the container 1 at the flange 2 thereof. This structure includes a cap means made up of an outer closure 3 which is in the form of an annular member made of sheet metal and surrounding the flange 2 and extending upwardly therefrom. The lower edge portion of the closure 3 is rolled inwardly at 4 so as to connect the closure 3 to the container 1. The cap means includes in addition to the closure 3 an elongated tubular member 6 which extends through the neck of the container 1 downwardly into the interior thereof. An outwardly extending annular flange 7 is fixed to the top end of the tubular member 6 as by being formed integrally therewith, and a sealing ring 5 of a suitable material such as soft rubber and the like is located against the top face of the container 1 between the latter and the flange 7. The closure 3 surrounds the flange 7 and sealing member 5 and the inward rolling of the bottom edge portion 4 of the closure 3 serves to tightly clamp the cap means to the container in a fluid-tight manner. A flexible tube in the form of a hose 8 is connected to the bottom end portion of the tubular member 6 and extends to the bottom of the container 1 so that in this way the interior of the tube 6 communicates with a lower portion of the container and it is thus possible to dispense almost all of the fluid within the container 1.

A tube 9 is coaxial with the tubular portion 6 and is slidably guided by the cap means, this tube 9 extending from the exterior of the cap means into the interior thereof, in the manner shown in Fig. 1. A spring 10 within the tubular member 6 has its bottom end in engagement with a shoulder of the tubular member 6 and has its top end in engagement with the bottom end of the tube 9 so as to urge the latter upwardly to one of its end positions. The tube 9 is formed intermediate its ends with a transverse wall 9', and this transverse wall 9' divides the interior of the tube 9 into a lower chamber 11 and an upper chamber 12, and in both of these chambers the tube 9 is formed with a pair of openings, respectively. Thus, the tube 9 is formed beneath the transverse wall 9' with an opening 13, and above the transverse wall 9' the tube 9 is formed with an opening 15. Also, the tube 9 is formed between the wall 9' and opening 15 with an additional opening 14 for a purpose described below.

The upper portion of the closure 3 is in the form of a tube which extends upwardly from the flange 7 and which has a top wall formed with an opening through which the tube 9 extends. This upper tubular portion of the closure 3 serves to accommodate a tubular housing 16 of a metering chamber 27 which is located in the interior of the cap means. A sealing ring 17 of a suitable yieldable material is located between the top wall of the metering chamber housing 16 and the top wall of the closure 3, and the tube 9 extends slidably through the sealing ring 17 in a fluid-tight manner. It will be noted that in the position of the parts shown in Fig. 1 the opening 15 is closed by the sealing ring 17. It will be noted that the tubular member 6 is annularly stepped at the region where it is joined to the flange 7, and this annularly stepped portion of the tubular member 6 accommodates another sealing ring 18 which slidably surrounds the tube 9 in a fluid-tight manner to serve as a further guide therefor and to cooperate with the opening 13 for closing the latter when the manually operable portion of the dispensing means is in another position. A plate 19 formed with an opening through which the tubular member 9 extends serves to maintain the sealing ring 18 in its position shown in Fig. 1, and it will be noted that this plate 19 together with the flange 7 and the sealing ring 5 are clamped between the top face of the container 1 and a portion of the closure 3.

The tube 9 is provided intermediate its ends with an outwardly extending annular flange 20 fixed to the tube 9 as by being formed integrally therewith, and this flange 20 may also be in the form of a collar separate from and fixed to the tubular member 9. This flange 20 cooperates with the top wall of the metering chamber housing 16 to limit the outward movement of the tube 9, and in the particular construction illustrated in Fig. 1 a sealing ring 21 is located about the tube 9 on the top face of the flange 20 to engage the top wall of the metering chamber housing 16. The flange 20 also serves to limit the downward stroke of the tube 9, and for this purpose a stop sleeve 22 surrounds the tube 9 with clearance and rests with its bottom end on the plate 19. This sleeve 22 has at its outer surface longitudinally extending ribs which engage the inner surface of the metering chamber housings 16 so that the sleeve 22 is accurately centered within the metering chamber 27, and the top face of the sleeve 22 is located beneath the flange 20 so that the latter engages the top face of the sleeve 22 to limit the downward movement of the tube 9 and thus limit the stroke of the dispensing device. The sleeve 22 may be replaced by another sleeve 22 of a different length in order to provide different strokes for the tube 9, and also by providing a particular stop sleeve 22 of a given height and thickness it is possible to control the volume of the metering chamber 27.

A resilient sleeve 23 surrounds the tube 9 beneath the flange 20 and covers the opening 14, this sleeve 23 being made of a yieldable resilient material such as rubber or the like for a purpose described below. It will be noted that the outer diameter of the sleeve 23 is less than the inner diameter of the stop sleeve 22 so that the sleeve 23 freely moves into and out of the sleeve 22 during the operation of the device of the invention.

A spray head 24 frictionally engages the top end portion of the tube 9 in the manner shown in Fig. 1, and this spray head 24 is provided with a spray nozzle 26 as well as with a chamber communicating with the interior portion 12 of the tube 9 and communicating through a bore 25 with the spray nozzle 26. As is apparent from Fig. 1, the spray head 24 surrounds the upper tubular portion of the closure 3, and as the spray head 24 is pushed downwardly by the operator to move the tube 9 downwardly therewith the bottom end of the spray head 24 approaches a top surface portion of the closure 3. If desired the cooperation between the bottom end of the spray head 24 and the top face of the closure 3 located beneath this bottom end of spray head 24 may be used to limit the downward movement of the tubular member 9. Furthermore, instead of providing a stop sleeve 22, it is possible to provide the tube 9 with a downwardly directed annular shoulder which engages the plate 19 to limit the downward movement of the tube 9.

It will be noted that with the position of the parts shown in Fig. 1 the metering chamber 27 communicates through the opening 13 and the tubular member 6 with the interior of the container and at the same time this metering chamber 27 is out of communication with the outer atmosphere, so that in this position of the parts the fluid under pressure in the container 1 is free to move into and fill the metering chamber 27.

Before the structure is ready for use, the entire dispensing device is separated from the container 1 and the latter is filled from one-half to one-third full with the particular liquid which is to be sprayed in atomized form. Then the dispensing structure without the spray head 24 is joined to the container 1 as a unit, and this is done simply by passing the closure 3 downwardly about the flange 2 and then rolling the bottom edge portion 4 of the closure 3 inwardly against the container to tightly clamp the dispensing structure to the container in a fluid-tight manner. Now a gas under pressure is introduced into the container, and this is done with the parts in the position of Fig. 1 and without the spray head 24. The top end of the tube 9 is connected in a fluid-tight manner to a source of gas under pressure, and this gas simply flows along the interior portion 12 of the tube 9 to the opening 14 and from the latter into the space between the resilient sleeve 23 and the tube 9. The pressure of the gas is sufficient to move a portion of the sleeve 23 away from the tube 9 so that the gas flows downwardly between sleeve 23 and tube 9 into the metering chamber 27 and from the latter through the opening 13 into the container 1. Thus, the resilient sleeve 23 acts as a non-return valve enabling the gas under pressure to flow into the container when the parts have the position shown in Fig. 1 but preventing this gas from flowing out of the container through the opening 14. After the desired amount of gas under pressure has thus been placed within the container 1 the tube 9 is disconnected from the source of gas under pressure and the spray head 24 is pushed onto the top end portion of the tube 9. In thus joining the spray head 24 to the tube 9 the latter will be moved downwardly and only the fluid which happens to be located in the metering chamber 27 will be discharged during this joining of the spray head 24 to the tube 9. When the spray head 24 is pressed downwardly together with the tube 9, after the parts have been assembled as indicated in Fig. 1, the opening 13 becomes closed by the sealing ring 18 and the opening 15 is moved downwardly into communication with the chamber 27 so that the fluid under pressure therein may flow through the opening 15 and chamber 12 to the spray head and out through the nozzle 26 thereof. Thus, it will be seen that with the parts in the position shown in Fig. 1 the metering chamber 27 communicates with the interior of the container 1 while when the tube 9 together with the spray head 24 are moved downwardly the metering chamber is placed out of communication with the container and in communication with the outer atmosphere so that the fluid under pressure within the metering chamber 27 may discharge to the outer atmosphere. At the end of the downward stroke the operator merely releases the spray head 24 and the spring 10 returns the parts to the position shown in Fig. 1, and it is evident that during such movement the chamber 27 which has previously been evacuated is placed in communication with the interior of the container 1 so that the fluid therein may flow upwardly through the hose 8 and tubular portion 6 and into the chamber 11 of the tube 9 to move through the opening 13 into the metering chamber 27 in order to fill the latter. It is also evident that during one downward stroke of the tube 9 only a predetermined amount of fluid will be dispensed, so that in this way if a very expensive fluid is used it will not be possible for the operator to dispense too much fluid.

It should be noted that if the container 1 is filled with a fluid which includes a gas in liquid form at a temperature below room temperature which becomes a gas under pressure at room temperature, then at such a low temperature the liquid may simply be poured into the container 1 before the other structure is joined thereto, and in this event it will be unnecessary to introduce a gas under pressure through the opening 14, so that with such an arrangement this opening 14 as well as the sleeve 23 may be omitted.

Fig. 2 illustrates another embodiment of the invention where the closure 3 does not include a tubular extension extending upwardly from the container, so that the embodiment of Fig. 2 may be used where it is desired to maintain all of the structure closer to the top of the container. As may be seen from Fig. 2, the closure 3a is provided with a top wall directly engaging the sealing ring 17a which corresponds to the sealing ring 17 of Fig. 1, so that a plate 19 is unnecessary, and it will be noted that the closure 3a does not extend substantially above the sealing ring 17a. The downwardly extending bottom edge portion of the closure 3a is adapted to be rolled inwardly to join the structure of Fig. 2 to a container as shown in Fig. 1, and it will be noted that the sealing ring 5a together with the flange 7a will be clamped between the top of the container and the top wall of the closure 3a, this top wall being formed with an opening through which the tube 9a identical with the tube 9 extends, this tube 9a being provided with an opening 15a closed by the sealing ring 17a in the position of the parts shown in Fig. 2. The ring 17a slidably engages the tube 9a in a fluid-tight manner.

The flange 7a is connected integrally to the top end of a tube 6a which corresponds to the tube 6 but is longer than the same and serves to accommodate the metering chamber, this metering chamber being located within the upwardly extending tubular portion of closure 3 in the embodiment of Fig. 1. Thus, it will be seen from Fig. 2 that the sealing ring 18a is carried within the tube 6a at a shoulder of the latter, and the metering chamber housing 16a is accommodated within the tube 6a to form the metering chamber 27a in this tube 6a. The spring 10a is also accommodated within a lower portion of the tube 6a and this spring 10a engages a shoulder of the tube 6a and at its top end engages an apertured dish 28 which engages the bottom end of the tube 9a to urge the latter upwardly to the position shown in Fig. 2. The bottom end of the tube 6a is connected to a flexible hose similar to the hose 8 for providing communication between the bottom of the container and the interior of the tube 6a.

In the embodiment of Fig. 2 the stop sleeve 22 has been omitted, and instead the resilient sleeve 23a which covers the opening 14a is adapted to engage with its bottom face the bottom wall of the metering chamber 27a so as to limit the downward movement of the tube 9a.

The spray head 29 of Fig. 2 is provided with a spray nozzle and a chamber communicating with this spray nozzle and the upper chamber 12a of the tube 9a and this chamber as well as the spray nozzle and the communication therebetween have the form shown in Fig. 1. However the outer shape of the spray head 29 is different in that it is simply in the form of a cylinder adapted to move freely downwardly about the neck of the container during the downward stroke of the tube 9a. It will be noted that in the position of the parts shown in Fig. 2 the opening 13a beneath the transverse wall of the tube 9a communicates with the chamber 27a and the interior of the container while the opening 15a is closed, and when the spray head 29 is pushed down this opening 15a communicates with the metering chamber 27a and the opening 13a is closed, so that it is evident that the embodiment of Fig. 2 operates in the same way as that of Fig. 1.

The embodiment illustrated in Fig. 3 is more compact than the above described embodiments and is similar to Fig. 2 except for the location of the spring and the length of the tube extending into the container. The elements of Fig. 3 which correspond to those of Figs. 1 and 2 are indicated with the same numerals followed by the letter b. As may be seen from Fig. 3 the closure 3b is adapted to be connected to the container 1 in the same way as the closure 3 of Fig. 1 and this closure 3b is identical with the closure 3a described above. The tube 6b, however, is shorter than the tube 6a and the spring 10b is located within the metering chamber 27b in the embodiment of Fig. 3. This spring 10b engages with its bottom end the bottom wall of the metering chamber 27b and with its top end the flange 20b, so that the spring 10b in the embodiment of Fig. 3 also urges the tube 9b to its rest position where the metering chamber 27b communicates through the opening 13b with the interior of the container. The tube 8b extends into the bottom open end of the tube 6b rather than along the exterior of the same in the manner shown in Fig. 1. Also, the spray head 30 is smaller than the above described spray heads 24 and 29 as may be seen by a comparison of Figs. 1, 2 and 3. This spray head 30 engages the top end of the tube 9b with a friction fit in the same way as the spray heads 24 and 29 and is provided in the same way with a chamber communicating with the chamber 12b and with a spray nozzle. However the spray head 30 has the frusto-conical shape indicated in Fig. 3. If desired the spray head 30 may be provided with a downwardly extending skirt adapted to move downwardly along the neck of the container, as indicated in dotted lines in Fig. 3. The structure of the embodiment of Fig. 3 is shown in Fig. 3 in the position where the metering chamber 27b is filled with the fluid under pressure which is in the container, the opening 15b being closed by the sealing ring 17b at this time. The structure of Fig. 3 is shown in Fig. 4 in the position where the metering chamber 27b communicates with the outer atmosphere so that the fluid under pressure in the metering chamber is discharged to the outer atmosphere. It will be noted from Fig. 4 that this embodiment of the invention the cooperation between the bottom face of the spray head 30 and the top face of the closure 3b serves to limit the downward movement of the tubular member 9b. As may be seen from Fig. 4 the opening 15b is located in this position of the parts within the metering chamber 27b while the opening 13 is either closed by the sealing ring 18b or is located below the same so that there can be no communication between the interior of the container and the chamber 27b in this position of the parts. After the metering chamber 27b is evacuated by placing the parts in the position shown in Fig. 4, the spray head 30 is released and spring 10b returns the parts to the position of Fig. 3 so that the chamber 27b is again filled.

Inasmuch as some fluids which it may be desired to dispense will have the property of causing sealing rings made of certain materials such as certain types of rubber to expand, it is sometimes advisable to provide an arrangement where such expansion of the sealing rings will not cause them to tightly grip the tube 9 with a force which may eventually even prevent operation of the dispensing structure. Fig. 5 shows an arrangement where such increase of frictional engagement between the sealing rings and shiftable tube cannot occur. The elements of Fig. 5 which correspond to the above described elements are indicated with the same numerals followed by the letter c. It is pointed out, however, that the spray head 30 of Fig. 5 is identical with the spray head 30 of Figs. 3 and 4 and is provided with the cutouts 25c and 26c communicating with each other and with the chamber in the spray head 30 which communicates with the chamber 12c of the tube 9c. It will be noted that with the embodiment of Fig. 5 the top and bottom walls of the metering chamber housing 16c are formed at their outer faces with central depressions so that the top and bottom walls of the metering chamber housing 16c engage the sealing rings 17c and 18c only at the outer peripheries of the latter, so that these sealing rings are clamped in position only at their outer peripheries and have relatively free inner peripheries. The ring 17c is clamped between the closure 3c and the top wall of the housing 16c, while the ring 18c is clamped between a wall portion 34 of the tube 6c and the bottom wall of the housing 16c. The tube 6c and closure 3c are joined to each other and to the container in the same way as described above in connection with Fig. 2 or 3. The metering chamber housing 16c is made up of two cylindrical parts which engage each other at their open ends to form an elongated closed cylinder in the manner indicated in Fig. 5, the top and bottom walls of the cylinder formed by the two cylindrical portions of the housing 16c being formed so that the tubular member 9c may pass therethrough in the manner shown in Fig. 5.

It will be noted that the recesses formed in the top and bottom walls of the metering chamber housing 16c accommodate the inner peripheral portions of the sealing rings 17c and 18c with clearance so as to provide chambers 33 into which the material of the sealing rings may be freely expanded. Moreover the inner peripheral portions of each sealing ring 17c and 18c is thicker than its outer peripheral portion and the face of the sealing ring which is directed toward the chamber 33 is formed with an annular groove separating the thicker and thinner portions of each sealing ring. Thus, with this arrangement the sealing rings may freely expand without undesirably increasing the frictional engagement between the sealing rings and the shiftable tube 9c.

It will be noted that with the embodiment of Fig. 5 the tube 9c is formed at its transverse wall 31 with an annular groove into which the bottom end portion 32 of the resilient sleeve 23c extends so that this tube 23c is securely maintained at the desired elevation with the embodiment of Fig. 5. During filling of the container with a gas under pressure, this gas will flow through the opening 14c and will move a part of the resilient sleeve 23c away from the groove formed in the tube 9c. Thus, only a portion of the bottom peripheral part 32 of the resilient sleeve 23c will be moved away from the tube 9 to allow the gas under pressure to enter into the metering chamber 27c to move from the latter through the opening 13c into the container.

Except for the differences noted above, the embodiment of Fig. 5 is substantially identical with that of Fig. 3. It will be noted that the spring 10c is located within the metering chamber 27c in the same way as with the embodiment of Fig. 3. However, it will also be noted that with the embodiment of Fig. 5 a stop sleeve 22c is provided to engage the flange 20c and thus limit the downward movement of the sleeve 9c, so that with this embodiment engagement between the spray head 30 and the closure 3c need not be relied upon. Also, the stop sleeve 22c serves to decrease the volume of the metering chamber 22c. It will be noted that in the embodiment of Fig. 5 the stop sleeve 22c does not have any outwardly extending ribs and is in the form of a simple cylinder. However it is also possible, if desired, to provide a stop sleeve which has outwardly extending centering ribs engaging the inner face of the metering chamber housing in the same way as in the embodiment of Fig. 1.

According to the embodiment of the invention which is shown in Fig. 6, the container 1d is provided with an outwardly extending flange 2d at its top end, as is evident from the left side of Fig. 6. A sealing ring 5d engages the top face of the container, and a closure 3d surrounds the top end of the container and has an inwardly rolled bottom edge portion 4d fixing the closure to the container in the manner described above. Between the closure and the sealing ring 5d there is clamped a flange 7d of an elongated tubular member 6d having an open bottom end communicating with the interior of the container. The flexible hose 8d is connected to the bottom end of the tubular member 6d in the manner shown in Fig. 6, and in the same way as with the above described embodiments the hose 8d extends to the bottom of the container.

Instead of being made of glass, the container may be made of metal, for example, and such a container 1e is shown at the right side of Fig. 6. As is apparent from the right side of Fig. 6, when such a metal container is used, the closure 3e is rolled around the flange 7e adjacent the top of the tubular member 6d and extends beneath this flange 7e so as to fix the flange to the closure in the manner shown at the right part of Fig. 6. The container 1e has an outwardly extending portion 2e between which the sealing ring 5e is clamped in the manner shown in Fig. 6, so that with this form the sealing ring 5e is located in a fluid-tight manner between the closure 3e and the portion 2e of the container 1e. The container 1e has an upper portion 4e which is rolled over the closure 3e so as to provide in this way a fluid-tight connection of the dispensing structure to the container.

The closure 3d or 3e has an upper portion of a smaller diameter than the remainder thereof formed with an opening through which the tube 9d passes, and in this upper portion of the closure there is located the sealing ring 17d which engages the tube 9d in a fluid-tight manner. The tube 6d is provided with a portion extending upwardly from the flange 7d or 7e and engaging the bottom face of the sealing ring 17d. This upwardly extending portion of the tubular member 6d is provided at its interior with a shoulder which serves as a seat for a ring 57 having an annular projection 58 at its top face. As is apparent from Fig. 6 this projection 58 has an outer face forming part of a cone and an inner face forming part of a cylinder, so that when this projection 58 extends into the soft material of the sealing ring 17d the projection 58 will urge the material of the ring 17d outwardly away from the tube 9d, and in this way it will not be possible for the sealing ring 17d to engage the tube 9d with more than the desirable amount of friction. It will be noted that the ring 57 extends with clearance about the tube 9d so as to provide between this tube and the ring 57 a chamber 55.

The tube 9d is formed along its entire length with a hollow continuous space 53, and furthermore the tube 9d is formed with an opening 54 covered by the sealing ring 17d in the position of the parts shown in Fig. 6 and with an opening 67 located adjacent the bottom end of the tube 9d. The top end portion of the tube 9d has a part 51 of a smaller diameter than the remainder of the tube 9d, and this top end portion of the tube extends into the spray head 24d so that between the latter and the upper portion 51 of the tube 9d there is a space 52. The downwardly directed face of the bore of spray head 24d which receives the tube 9d is formed with a groove 50 communicating with the chamber 53 in the interior of the tube 9d and with the chamber 52 surrounding the portion 51 of the tube 9d. This chamber 52 communicates with the bore 25d which in turn communicates with the spray nozzle 26d.

Intermediate its ends the tube 9d is provided with an outwardly extending annular flange 20d integral with the remainder of the tube, and between this flange and the inwardly extending upper flange of the ring 57 there is located a sealing ring 21d in the manner shown in Fig. 6. This sealing ring 21d engages the undersurface 56 of the inwardly extending flange of the ring 57, in the manner shown in Fig. 6.

The portion of the tube 9d which extends downwardly from the flange 20d carries a resilient sleeve 60 which resiliently and yieldably grips the tube 9d and which covers the opening 67. It will be noted that the tube 68 extends downwardly beyond the bottom end of the tube 9d.

A plate 61 has its top face in engagement with the bottom face 65 of the resilient sleeve 68, and the construction of this plate 61 is indicated in Fig. 7. As may be seen from Fig. 7 the plate 61 is of a substantially circular configuration and has projections extending radially therefrom and spaced about the axis thereof, these projections being spaced slightly from the inner surface of the tubular member 6d, in the manner shown in Fig. 6. A longitudinally grooved projection 60 is fixed to the top face of the plate 61 and extends upwardly therefrom freely into the interior portion 53 of the tube 9d. Also, a longitudinally grooved projection 63 is fixed to and extends downwardly from the bottom face of the plate 61. These longitudinally grooved projections 60 and 63 may be formed by a plate which is substantially flat and a pair of additional plates extending normally from the opposite faces thereof, respectively, as is indicated in Fig. 7.

The downwardly extending longitudinally grooved projection 63 extends freely into the interior of a coil spring 10d whose top end engages the underside of the plate 61 and whose bottom end engages a horizontal surface portion formed at a part of the tube 6d where its diameter decreases. A resilient sleeve 64 is located in the tube 60 and freely surrounds the spring 10d, in the manner shown in Fig. 6.

The above described structure of Fig. 6 operates as follows:

With the parts in the position shown in Fig. 6 the spring 10d urges the plate 61 upwardly and acts through the latter on the sleeve 68 and through the sleeve 68 on the flange 20d to maintain the sealing ring 21d against the inwardly extending flange of the ring 57. Thus, the parts are maintained in the position where the tubular member 9d is at the upper end of its stroke, and in this position of the parts the metering chamber 27d which is formed by the free space in the interior of the tubular member 6d communicates with the interior of the container which holds the fluid under pressure. As is apparent from Fig. 6 there is a gap between the top face 62 of the resilient member 64 and the bottom face of the plate 61, so that the fluid within the container can flow freely along the interior of the hose 8d, and the tubular member 6d through this latter gap into the metering chamber 27d to fill the latter. Because of the engagement between the top face of the plate 61 with the bottom face 65 of the sleeve 68 the fluid in the interior of the metering chamber 27d cannot flow to the interior of the tube 9d, and at this time the opening 54 is covered by the sealing ring 17d, so that the fluid in the metering chamber 27d cannot flow to the outer atmosphere.

When the operator pushes down on the spray head 24d, the opening 54 communicates with the chamber 55 formed between the ring 57 and the tube 9d, and the sealing ring 21d moves downwardly away from the inwardly extending flange of the ring 57, so that the fluid under pressure within the metering chamber 27 can flow freely through the opening 54 into the interior 53 of the tube 9d from the latter along the groove 50 into the chamber 52 through the opening 25d and out through the spray nozzle 26d.

Upon release of the spray head 24d, the spring 10d returns the parts to the position shown in Fig. 6, and the fluid under pressure within the container automatically flow into and fills the metering chamber 27d.

When it is desired to fill the container, the parts have the position shown in Fig. 6 except that the spray head 24d is not yet located with its frictional fit on the tube 9d. Instead the filling device is joined to the upper portion of the tube 9d simply by placing this portion of the tube 9d in communication with a source of gas under pressure. Previously, that is before the dispensing device has been joined to the container the latter has been filled from one-half to one-third with the liquid to be dispensed. When the source of gas under pressure is connected to the tube 9d with the parts in the position shown in Fig. 6 and before the spray head 24d is joined to the tube 9d, the gas under pressure flows downwardly along the interior portion 53 of the tube 9d and this gas under pressure on the one hand urges the plate 61 down against the action of the spring 10d so that the gas flows into the chamber 66 and from the latter through the space between the bottom end of the sleeve 68 and the top face of the plate 61 into the metering chamber and from the latter through the gap which still remains between plate 61 and the top end 62 of the sleeve 63 into the interior of the container, and on the other hand the gas under pressure flows through the opening 67 and between the sleeve 68 and the tube 9d into the interior of the chamber 27d and from the latter into the interior of the container, the gas under pressure having a force sufficient to move the sleeve 68 at least in part away from the tube 9d to provide a passage for the gas under pressure.

When the container has been filled to the desired extent with the gas under pressure the tube 9d is disconnected from the source of gas under pressure and the spray head 24d is placed on the tube 9d so that it has the position shown in Fig. 6, and during pushing down of the spray head 24d on the tube 9d only the amount of fluid under pressure which happens to be located within the metering chamber 27d can be discharged to the outer atmosphere in the manner described above.

A simplification of the structure shown in Fig. 6 is illustrated in Fig. 8 according to which the sealing rings 17d and 21d of Fig. 6 are combined into a single ring and a separate ring 57 is omitted. Thus, referring to Fig. 8, it will be seen that the sealing ring 17f surrounds the tube 9f and has its bottom face in engagement with the top face of the flange 20f of the tube 9f so as to limit the upward movement of the latter. The tubular member 6f extends upwardly into direct engagement with the bottom face of the sealing ring 17f which is clamped between the upper portion of the closure 3f and the top face of the tube 6*f*. This top face of the tube 6*f* is provided with an annular projection substantially identical with the above described annular projection 58, so that this annular projection at the top face of the tubular member 6*f* engages the soft material of the sealing ring 17*f* and urges this material away from the tube 9*f* so that the latter cannot be clamped with an undesirable amount of friction.

It will be noted that with the embodiment of Fig. 8 the opening 54*f* which corresponds to the opening 54 of Fig. 6 is closed in the position of the parts shown by the sealing ring 17*f*, and the opening 67*f* of the tube 9*f* corresponds to the opening 67, the resilient sleeve 68*f* of Fig. 8 being substantially identical with resilient sleeve 68 of Fig. 6. Except for the above differences with respect to the sealing ring surrounding the opening 54*f*, the structure of Fig. 8 is identical with that of Fig. 6. Of course, during downward movement of the tube 9*f* the stroke of the tube is larger than that of Fig. 6 in order to place the opening 54*f* in communication with the chamber 27*d* at the end of the downward stroke of the tube 9*f*. This longer stroke can be provided by making the resilient tube 64 of Fig. 6 shorter as well as by making the plate 61 thinner.

With either the embodiment of Fig. 6 or that of Fig. 8 it is possible to eliminate the openings 67 or 67*f* if the container is filled with a fluid which is at a low enough temperature to have a gas in liquid form which becomes a gas under pressure at room temperature.

Also, it should be noted that it is possible to eliminate the flange 20 as shown in Fig. 8 and to unite the sleeves 68*f* and 17*f* into one sleeve. With such an arrangement the opening 54*f* would be omitted and only an opening similar to the opening 67*f* would be provided, this opening being located adjacent the bottom end of the tube 9*f*. Furthermore the plate 61 would be rigidly connected in a fluid-tight manner to the bottom end of the tube 9*f*. Except for these differences the structure would be identical with that of Fig. 6. It will be noted that with such a construction the downward stroke of the tube 9*f* would be sufficient to place the opening 67*f* in communication with the chamber 27*d*, and in the upper position the single opening 67*f* of the tube 9*f* would be closed by the resilient sleeve. In this upper position the gas in the interior of the container would communicate through the resilient tube 64 with the interior of the chamber 27*d*, and the plate 61 fixed to the bottom end of the tube 9*f* and closing this bottom end would not necessarily engage the bottom end of the resilient sleeve 68*f* which might terminate above the bottom end of the tube 9*f*. The downward stroke of the tube 9*f* with such a construction would place the plate 61 against the top end 62 of the tube 64 so as to cut off communication between the interior of the container and the metering chamber 27*d* and so as to place this chamber in communication with the opening 67*f* which would now be moved downwardly beyond the sleeve 68*f* which is united with the sealing ring 17*f*. In the rest position of such an embodiment filling could still take place because the gas under pressure would move through the opening 67*f* and would move the sleeve 68*f* away from the tube 9*f* so that the gas under pressure could enter into the chamber 27*d* and move from the latter into the container through the space between the top of the tube 64 and the bottom face of the plate 61.

In some cases it may be desirable to insert the dispensing device in the bottom of the container which is then closed at its bottom, and such an arrangement is illustrated in Fig. 9 where the closure 3*g* of the dispensing device has been moved into the container through the bottom end thereof, this bottom end thereafter being closed. A sealing ring 5*g* located between a portion of the closure 3*g* and the inwardly extending flange at the top of the container 1*g*, in the manner shown in Fig. 9. After the closure 3*g* with all of the parts connected thereto such as the flange 7*g* of the tube 6, the neck portion 4*g* of the container 1*g* is rolled inwardly in the manner shown in Fig. 9 so as to fix the closure 3*g* in the position illustrated where it is in fluid-tight connection with the container. Except for these differences illustrated in Fig. 9 this embodiment of the invention may be identical with any of the above described embodiments of the invention.

According to the embodiment shown in Fig. 9A the container 1*h* has an upwardly extending flange 2*h* which is rolled inwardly at its uppermost portion, in the manner shown in Fig. 9A. The closure 3*h* is joined to this portion 2*h* of the container 1*h* by having its bottom edge portion 4*h* rolled inwardly in the manner indicated in Fig. 9A, the sealing ring 5*h* and flange 7*h* being fixed between the top of the container and a portion of the closure 3*h* in the manner shown in Fig. 9A. As is indicated in Fig. 9A, the upper portion of the container 1*h* may be rolled outwardly instead of inwardly, and this variation is indicated in dotted lines in Fig. 9A. Of course, the containers of Figs. 9 and 9A may be made of metal.

Figs. 10–13 illustrate an embodiment of the invention where the longitudinally shiftable tube is open throughout its entire length and is formed with only one opening passing through a wall portion thereof. Referring to Fig. 10 it will be seen that in this embodiment the container 91 which may be identical with the container 1 is formed at the upper portion of its neck with an outwardly extending flange 92. The closure 93 surrounds and is joined to the flange 92 by having its lower edge portion 94 rolled inwardly in the manner shown in Fig. 10. A sealing ring 95 is clamped against the top face of the neck of the container 91 between this top face and the outwardly extending annular flange 97 at the top end of the tubular member 96 which extends downwardly through the neck of the container 91 into the interior thereof, this tubular member 96 having a bottom end to which a hose 98 is joined, this hose extending to the bottom of the container.

One of the distinctive features of the embodiment of Figs. 10–13 resides in the fact that a resilient diaphragm 121 is clamped at its outer periphery between a portion of the closure 93 and the flange 97. The tube 99 extends downwardly through the top wall of the closure 93 and through the diaphragm 121 into the metering chamber 127 formed by the interior portion of the tube 96. It will be noted that the upper part of the metering chamber 127 is defined by the diaphragm 121. This diaphragm 121 is clamped at its inner periphery between the outwardly extending flange 120 of the tube 99 and a collar 136 fixed to the tube 99 at the exterior thereof. The upper portion of the closure 93 is in the form of a recess into which the collar 136 fits in the manner shown in Fig. 10.

The top end portion 112 of the tube 99 has a reduced outer diameter forming a chamber 115 between the tube 99 and the spray head 124 which frictionally engages the upper portion of the tube 99. Furthermore the spray head 124 is formed with a groove 116 providing communication between the interior 11 of the tube 99 and the chamber 115, and this chamber 115 communicates with the bore 125 and through the latter with the spray nozzle 126.

The tube 99 is formed with a single opening 114 located adjacent its bottom end. A resilient sleeve 133 surrounds the tube 99 directly beneath the flange 120 thereof and covers the opening 114 in the position of the parts shown in Fig. 10.

Beneath the sleeve 133 there is located within the chamber 127 a member having the construction shown most clearly in Fig. 12. As is evident from Fig. 12 this member is in the form of a cylinder 139 which is open at its bottom and which has a top wall 138 formed with a bore through which the bottom end of the tube 99 passes with clearance to provide between the tube 99 and the inner periphery of the top wall 138 the chamber 141 indicated in Fig. 10. The wall of the cylinder 139 is formed with a plurality of axially extending slots 140 extending all the way to the top face of the wall 138 and all the way to the bottom of the cylinder 139. This cylinder is positioned in the chamber 127 in the manner shown in Fig. 10. The top face of the wall 138 engages the bottom face 135 of the sleeve 133.

A sealing ring 137 is located within the cylinder 139 and engages the bottom face of the wall 138 and the bottom end of the tube 99 in the position of the parts shown in Fig. 10. A circular plate 122 is freely slidable within the interior of the cylinder 139 and engages with its top face the bottom face of the sealing ring 137. A longitudinally grooved projection 130 similar to the projection 60 is fixed to the top face of the plate 122 and extends from the latter through the sealing ring 137 into the interior 111 of the tube 99 where its projection 130 has a sliding fit. A longitudinally grooved projection 129 is fixed to and extends downwardly from the bottom face of the plate 122 into the interior of a coil spring 110 which is located within a resilient tube 131 which rests on a portion of the tube 96 where the latter is reduced in diameter, in the manner shown in Fig. 10. It will be noted that with the position of the parts shown in Fig. 10 there is a gap 132 between the top end of the resilient tube 131 and the bottom face of the plate 122. In this position of the parts the spring 110 acts through the plate 122 to urge the sealing ring 137 against the bottom end of the tube 99 and against the bottom face of the wall 138 of the cylinder 139. Furthermore the spring 110 forces the diaphragm 121 upwardly to the position shown in Fig. 10 where this diaphragm engages the closure 93 and where the collar 136 is located within the recess at the top portion of the closure 93.

With the position of the parts shown in Fig. 10 the interior of the container 91 communicates through the tube 98 and the interior of the tubular member 96 and through the gap 132 with the chamber 127 so that this metering chamber is filled with the fluid under pressure which is to be dispensed. This fluid under pressure cannot pass to the outer atmosphere through the tube 99 because the opening 114 thereof is closed by the sleeve 133 and because the bottom end of the tube 99 is closed by the sealing ring 137.

When the dispensing device of Fig. 10 is manually operated to dispense fluid, the spray head 124 is pushed downwardly so that the parts assume the position shown in Fig. 13. In this position of the parts the plate 122 engages the top end of the sleeve 131 so as to close the gap 132 and in this way cut off communication between the interior of the container and the metering chamber 127. At the same time the opening 114 moves downwardly into communication with the chamber 141 formed between the inner periphery of the wall 138 and the outer surface of the tube 99, and the fluid within the chamber 127 can now flow through the gap 142 formed between the bottom face of wall 138 and the top face of sealing ring 137 into the chamber 141 and from the latter through the opening 114 into the inner portion 111 of tube 99 and from the latter through the spray head to the outer atmosphere. It will be noted that during the downward movement of the tube 99 the cylinder 139 moves downwardly therewith through a short distance until the bottom end of the cylinder 139 engages a shoulder formed in the interior tubular member 96, and thereafter the tubular member 99 continues to move downwardly with respect to the cylinder 139 until the parts have the position shown in Fig. 13.

Upon release of the spray head 124, the spring 110 returns the parts from the position of Fig. 13 to that of Fig. 10, and this results in again closing the chamber 127 from the outer atmosphere and placing this chamber in communication with the interior of the container 91, so that the fluid under pressure in the latter may now flow into the chamber 127 in order to fill the latter in preparation for the next operation of the dispensing device.

When the embodiment of Figs. 10 and 13 is to be filled with a gas under pressure, the parts have the position shown in Fig. 10 and the spray head 124 has not yet been attached to the tube 99. With the parts in the position of Fig. 10 the tube 99 is placed at its exterior portion in communication with a source of gas under pressure, and this gas under pressure flows along the interior portion 111 of the tube 99 on the one hand through the opening 114 and moves the resilient sleeve 133 away from the tube 99 so that the gas flows into the chamber 141 and the pressure of the gas is sufficient to move the sealing ring 137 together with the plate 122 downwardly slightly against the action of the spring 110 so that the gas under pressure flows into the chamber 127 and from the latter through the gap 132 into the interior of the container, and on the other hand some of the gas under pressure acts downwardly on the plate 122 to move the latter downwardly slightly so that the gas under pressure flows again through the gap 142 formed between the wall 138 and the sealing ring 137 into the chamber 127 and from the latter through the gap 132 into the interior of the container.

It should be noted that instead of forming the element 139 from a cylinder, it is possible to use a simple ring which forms the wall 38 and to attach to the underside of the latter a plurality of rods which extend downwardly from such a plate and form a device similar to the cylinder 139.

One possible device for filling any of the above described containers is illustrated in Fig. 14. Referring to Fig. 14, it will be seen that a suitable stationary support plate 82 carries a ring 83 which extends through an opening of the plate 82 and which has a lower annular flange engaging the bottom face of the plate 82, the top of the ring 83 being connected to a collar which engages the top face of the plate 82. The interior of the ring 83 is threaded, and the ring 83 is in threaded engagement with an elongated tubular member 84 whose height may be adjusted by turning with respect to the ring 83. A hollow nut member 75 is in threaded engagement with the bottom end portion of the tube 84 and engages an outwardly extending annular flange thereof; this nut member 74 being adapted to receive in its interior the top end of the device of the invention, as will be described below.

A tubular member 74 having a bottom interior frusto-conical surface portion is located slidably within the tubular member 84 and is provided with an outer threaded portion engaged by a nut 74' which engages the top end of the member 84 so that by turning the nut 74' the axial position of the member 74 within the tube 84 may be adjusted. The interior upper portion of the tube 74 is threaded and threadedly receives a tube 70 leading from a source of gas under pressure, and a lock nut 70' engages the tube 70 to fix the latter in its adjusted position with respect to the tube 74. A suitable sealing ring is provided in a groove of the tube 74 and engages the outer surface of the tube 70 to provide a fluid-tight connection between tube 70 and the tube 74.

A piston 71 is slidable within the tube 74 and carries a sealing ring which slidably engages the inner surface of the tube 74 in a fluid-tight manner. This piston 71 is fixed to an axially bored plunger 73 which is formed with the axial bore 73', this axial bore 73' having an enlarged diameter adjacent the bottom end of the plunger 73 and being threaded at this bottom end of the plunger 73.

A valve member 79 is threadedly connected to the threaded portion of the bore 73' of the plunger 73, and this valve member 79 extends slidably through a bore of a cylinder 85 in which the plunger 73 is slidable. A spring 72 surrounds the plunger 73, engages the underside of the piston 71, and engages the top end of the cylinder 85, this top end of the cylinder 85 having an outwardly extending annular flange which engages an inwardly extending annular flange of the tubular member 74, in the manner shown in Fig. 14. This latter inwardly extending flange of the tubular member 74 is formed with a groove in which a sealing ring is located, this sealing ring engaging the outer surface of the cylinder 85 to provide a fluid-tight connection between elements 85 and 74.

The bottom end portion of the cylinder 85 extends slidably through an opening in a top wall of a frusto-conical housing 77 having a bottom wall also formed with an opening, and this housing 77 accommodates in its interior a resilient sealing member 76 which may be made of a relatively soft material such as rubber or the like. A spacer sleeve 80 slidably surrounds the cylinder 85 and engages the top wall of the housing 77, and a spring 81 engages the underside of the inwardly extending flange of the tubular member 74 and the sleeve 80 to act through the latter on the housing 77 to urge the latter downwardly, as viewed in Fig. 14.

The valve member 79 is formed with an axial bore communicating with the bore 73' of the plunger 73 and extending almost to the bottom of the valve member 79. This axial bore of the valve member 79 communicates with a radial bore of the valve member 79 which extends to the exterior of the latter. It will be noted that the valve member 79 is provided with a shoulder engaging a shoulder of the cylinder 85 and that the latter closes the radial bore of valve member 79 in the position of the parts shown in Fig. 14. In the rest position of the parts the spring 81 locates the sleeve 80 and the housing 77 below the position shown in Fig. 14 with the housing 77 engaging the bottom wall of the hollow nut member 75.

The above described filling device operates as follows:

The container which is to be filled with the gas under pressure is placed with the tube 78 in the interior of the bore formed in the sealing member 76. This tube 78 corresponds to the upper portion of any of the tubes described above which carry the spray head, this spray head having been removed or having not yet been placed on the tube. With the tube thus located in the interior of the sealing member 76 which only loosely engages this tube, the container together with the closure 78' corresponding to any of the closures described above and all of the dispensing structure carried by the container is moved upwardly to the position shown in Fig. 14. It will be noted that the closure 78' engages the bottom face of the housing 77 and is freely movable through the opening in the bottom end of the nut member 75. This upward movement shifts the container shifts the housing 77 upwardly to the position shown in Fig. 14 against the action of the spring 81.

Now a suitable valve is opened in order to admit a gas under pressure into the conduit 70, and this gas under pressure flows from the conduit 70 into the tubular member 74 to engage the top face of the piston 71 and to flow downwardly along the passage 73' of the plunger 73 into the axial and radial bores of the valve member 79. The pressure of the gas which engages the piston is sufficient to move the piston together with the plunger 73 downwardly against the force of the spring 72, and this downward movement shifts the plunger 73 together with the valve member 79 downwardly with respect to the cylinder 85 so that the outer ends of the radial bore of the valve member 79 become uncovered and the gas under pressure flows into the hollow bottom end of the cylinder 85 to communicate with the top open end of the tube 78 as well as to act on the sealing member 76 to cause the latter to radially grip the tubular member 78. This gas under pressure does not shift the tubular member 78 downwardly, because with the arrangement of the parts shown in Fig. 14 it will only cause the soft sealing member 76 to radially grip the tubular member 78. Then the gas under pressure flows into the interior of the container in the manner described above.

When the container has been filled with gas under pressure to the desired extent, the valve which provides a flow of gas under pressure to the conduit 70 is shut, and then the gas pressure fails to act on the piston 71, so that the spring 72 shifts the plunger 73 upwardly so as to close the valve 79, and the reduction of the gas pressure acting on the sealing member 76 releases the grip of the latter on the tube 78 so that now the container together with the structure carried thereby can be removed from the filling device, the spring 81 returning the hollow member 77 to its starting position against the bottom wall of the hollow member 75.

It will be understood that each of the elements described above, or two or more together, may also find a useful application in other types of dispensing devices differing from the types described above.

While the invention has been illustrated and described as embodied in dispensing device for dispensing a fluid under pressure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A dispensing device comprising, in combination, a container adapted to hold a fluid under pressure, said container having an open top; cap means engaging said open top of said container to close the same and having in its interior a metering chamber, said cap means having a tubular open bottom end portion extending into and communicating with the interior of said container; a plurality of coaxial sealing rings carried by said cap means coaxially with said tubular end portion thereof and axially spaced from each other; an elongated tube having opposite open ends and formed intermediate said ends with a transverse wall, said tube having a pair of wall portions respectively located on opposite sides of said traverse wall and respectively formed with openings, said tube extending through and being slidably guided by said sealing rings for movement between one end position where one of said tube openings is closed by one of said sealing rings and the other of said openings is located in said metering chamber to provide communication between the latter and a first interior portion of said tube on one side of said transverse wall thereof and an opposite end position where said other opening is closed by another of said sealing rings and said one opening communicates with said metering chamber to place a second interior portion of said tube on the other side of said transverse wall in communication with the interior of said container and said metering chamber.

2. A dispensing device comprising, in combination, a container adapted to hold a fluid under pressure, said container having an open top; cap means engaging said open top of said container to close the same and having in its interior a metering chamber, said cap means having a tubular open bottom end portion extending into and communicating with the interior of said container; a plurality of coaxial sealing rings carried by said cap means coaxially with said tubular end portion thereof and axially spaced from each other; an elongated tube having opposite open ends and formed intermediate said ends with a transverse wall, said tube having a pair of wall portions respectively located on opposite sides of said transverse wall and respectively formed with openings, said tube extending through and being slidably guided by said sealing rings for movement between one end position where one of said tube openings is closed by one of said sealing rings and the other of said openings is located in said metering chamber to provide communication between the latter and a first interior portion of said tube on one side of said transverse wall thereof and an opposite end position where said other opening is closed by another of said sealing rings and said one opening communicates with said metering chamber to place a second interior portion of said tube on the other side of said transverse wall in communication with the interior of said container and said metering chamber, and said tube being formed with a third opening between said other opening and transverse wall; and a resilient sleeve resiliently engaging the outer surface of said tube and covering only said third opening thereof so that when said tube is in said opposite end position thereof a fluid under pressure communicating with said first interior portion of said tube will move through said third opening against the force of said sleeve between the latter and said tube into said metering chamber and from the latter through said one opening into said container.

3. A dispensing device comprising, in combination, a container adapted to hold a fluid under pressure, said container having an open top; cap means engaging said open top of said container to close the same and having in its interior a metering chamber, said cap means having a tubular open bottom end portion extending into and communicating with the interior of said container; a plurality of coaxial sealing rings carried by said cap means coaxially with said tubular end portion thereof and axially spaced from each other; an elongated tube having opposite open ends and formed intermediate said ends with a transverse wall, said tube having a pair of wall portions respectively located on opposite sides of said transverse wall and respectively formed with openings, said tube extending through and being slidably guided by said sealing rings for movement between one end position where one of said tube openings is closed by one of said sealing rings and the other of said openings is located in said metering chamber to provide communication between the latter and a first interior portion of said tube on one side of said transverse wall thereof and an opposite end position where said other opening is closed by another of said sealing rings and said one opening communicates with said metering chamber to place a second interior portion of said tube on the other side of said transverse wall in communication with the interior of said container and said metering chamber, and said tube being formed with a third opening between said other opening and transverse wall; and a resilient sleeve resiliently engaging the outer surface of said tube and covering only said third opening thereof so that when said tube is in said opposite end position thereof a fluid under pressure communicating with said first interior portion of said tube will move through said third opening against the force of said sleeve between the latter and said tube into said metering chamber and from the latter through said one opening into said container, said tube being formed at its exterior with an annular groove into which a lower edge portion of said resilient sleeve extends.

4. A dispensing device comprising, in combination, a container adapted to hold a fluid under pressure, said container having an open top; cap means engaging said open top of said container to close the same and having in its interior a metering chamber, said cap means having a tubular open bottom end portion extending into and communicating with the interior of said container; a plurality of coaxial sealing rings carried by said cap means coaxially with said tubular end portion thereof and axially spaced from each other; an elongated tube having opposite open ends and formed intermediate said ends with a transverse wall, said tube having a pair of wall portions respectively located on opposite sides of said transverse wall and respectively formed with openings, said tube extending through and being slidably guided by said sealing rings for movement between one end position where one of said tube openings is closed by one of said sealing rings and the other of said openings is located in said metering chamber to provide communication between the latter and a first interior portion of said tube on one side of said transverse wall thereof and an opposite end position where said other opening is closed by another of said sealing rings and said one opening communicates with said metering chamber to place a second interior portion of said tube on the other side of said transverse wall in communication with the interior of said container and said metering chamber, said cap means gripping said sealing rings only at outer peripheral portions thereof, respectively, and said sealing rings having inner peripheral portions located in free spaces in said cap means so that said inner peripheral portions may freely expand without retarding the sliding movement of said tube in said sealing rings.

5. A dispensing device comprising, in combination, a container adapted to hold a fluid under pressure, said container having an open top; cap means engaging said open top of said container to close the same and having in its interior a metering chamber, said cap means having a tubular open bottom end portion extending into and communicating with the interior of said container; a plurality of coaxial sealing rings carried by said cap means coaxially with said tubular end portion thereof and axially spaced from each other; an elongated tube having opposite open ends and formed intermediate said ends with a transverse wall, said tube having a pair of wall portions respectively located on opposite sides of said transverse wall and respectively formed with openings, said tube extending through and being slidably guided by said sealing rings for movement between one end position where one of said tube openings is closed by one of said sealing rings and the other of said openings is located in said metering chamber to provide communication between the latter and a first interior portion of said tube on one side of said transverse wall thereof and an opposite end position where said other opening is closed by another of said sealing rings and said one opening communicates with said metering chamber to place a second interior portion of said tube on the other side of said transverse wall in communication with the interior of said container and said metering chamber, said cap means gripping said sealing rings only at outer peripheral portions thereof, respectively, and said sealing rings having inner peripheral portions located in free spaces in said cap means so that said inner peripheral portions may freely expand without retarding the sliding movement of said tube in said sealing rings, said sealing rings each being formed in one face thereof with an annular groove located between said inner and outer peripheral portions thereof.

6. A dispensing device comprising, in combination, a container having an open top; cap means engaging and closing said open top of said container and having an open tubular bottom end portion extending into and communicating with the interior of said container, said cap means having a metering chamber in its interior; an elongated open tube coaxial with said tubular portion of said cap means and guided by the latter for longitudinal movement between a pair of end positions, said tube having opposite open ends the upper of which is located at the exterior of said cap means and the lower of which is located in said cap means in said metering chamber; an annular member located beneath and adjacent the bottom open end of said tube in said metering chamber and having a longitudinally grooved elongated projection fixed to the upper face of said annular member and extending freely into the exterior of said tube; spring means engaging said annular member and urging the latter toward said tube; and passage means formed in part by said annular member and communicating with the interior of said tube for placing the latter in communication with the outer atmosphere and said metering chamber and out of communication with the interior of said container in one end position of said tube and for placing the latter in communication with the interior of said container and said metering chamber and out of communication with the outer atmosphere in the other end position of said tube, so that a fluid under pressure in said container will fill said metering chamber when said tube is in said other end position thereof and will flow from said metering chamber to the outer atmosphere when said tube is in said one end position thereof.

7. A dispensing device comprising, in combination, a container having an open top and adapted to hold a fluid under pressure therein; cap means engaging and closing said open top of said container and having an elongated tubular portion extending into and communicating with the interior of said container, said cap means having a metering chamber in its interior; a first resilient sleeve coaxial with said tubular portion of said cap means and located in the latter extending at least partly into said metering chamber; an annular sealing ring carried by said cap means above and coaxially with said first sleeve; an elongated open tube extending slidably through said sealing ring and having in one end position a first opening covered by said sealing ring, said tube being formed with a second opening between said first opening and the bottom end of said tube; a second resilient sleeve resiliently engaging said tube at the exterior thereof and covering said second opening, said second sleeve having a bottom end located adjacent the bottom end of said tube; a plate located between said first sleeve and bottom end of said tube; a longitudinally grooved projection fixed to the upper face of said plate and extending from the latter freely into said tube; and a spring carried by said cap means within said first sleeve and engaging said plate for urging the latter toward said plate.

8. A dispensing device comprising, in combination, a container having an open top and adapted to hold a fluid under pressure; cap means carried by and closing said open top of said container and having an elongated open tubular portion extending into and communicating with the interior of said container; a resilient sleeve coaxial with said tubular portion of said cap means located in the latter; an elongated tube open throughout its length coaxial with said tubular portion and extending from the exterior into the interior of said cap means and being guided thereby for longitudinal movement, said tube having a bottom end adjacent said sleeve and being formed adjacent said bottom end with an opening passing through a wall portion of said tube; a rigid ring located with clearance about said tube in said cap means adjacent said bottom end of said tube; a plate located between said rigid ring and said sleeve; means supporting said rigid ring in said cap means above said plate and in free communication with the space in said cap means around said rigid ring; a longitudinally grooved projection fixed to said plate and extending therefrom freely into said tube; and spring means engaging said plate for urging the same toward said rigid ring to a position spaced from said sleeve.

9. In a dispensing device, in combination, a container having an open top; an annular closure engaging and closing said open top; a tubular member located in said open top and communicating with the interior of said container; an annular flange integral with said tubular member and located between said closure and said top of said container; a resilient diaphragm clamped at its periphery between said flange and said closure; and a second tubular member extending through and guided slidably by said closure, said diaphragm and said flange.

10. In a dispensing device, in combination, a container having an open top; an annular closure engaging and closing said open top; a tubular member located in said open top and communicating with the interior of said container; an annular flange integral with said tubular member and located between said closure and said top of said container; a second tubular member slidably guided by said closure for longitudinal movement with respect to the same and extending from the interior to the exterior of said closure, said second tubular member having intermediate its ends an annular exterior flange for limiting movement of said second tubular member outwardly of said closure; and a tubular stop sleeve located in said closure member and freely surrounding said second tubular member beneath said flange thereof for limiting movement of said second tubular member into said closure.

11. A dispensing device comprising, in combination, a container having an open top and adapted to hold a fluid under pressure; cap means carried by and closing said open top of said container and having an elongated open tubular portion extending into and communicating with the interior of said container; a resilient sleeve coaxial with said tubular portion of said cap means located in the latter; an elongated tube open throughout its length coaxial with said tubular portion and extending from the exterior into the interior of said cap means and being guided thereby for longitudinal movement, said tube having a bottom end adjacent said sleeve and being formed adjacent said bottom end with an opening passing through a wall portion of said tube; a rigid ring located with clearance about said tube in said cap means adjacent said bottom end of said tube; a plate located between said rigid ring and said sleeve; a plurality of legs fixed to said plate and extending axially from the same into engagement with a shoulder of said cap means for supporting said rigid ring in said cap means above said plate and in free communication with the space in said cap means around said rigid ring; a longitudinally grooved projection fixed to said plate and extending therefrom freely into said tube; and spring means engaging said plate for urging the same toward said rigid ring to a position spaced from said sleeve.

12. A dispensing device for dispensing a fluid, comprising, in combination, a container adapted to hold a fluid under pressure; metering chamber means carried by and closing said container and having a metering chamber in its interior; fluid passage means carried by said metering chamber means in a filling position placing the interior of said metering chamber in communication with the interior of said container and out of communication with the outer atmosphere, said fluid passage means being responsive to the pressure of a fluid communicating therewith from outside of the container for providing, while said fluid passage means is in said filling position thereof, a path from the exterior of the container through said metering chamber into the interior of said container, so that the latter may be filled with a fluid under pressure while said fluid passage means is in said filling position thereof; and filling means adapted to be removably connected to said fluid passage means for filling said container when said fluid passage is in said filling position thereof.

References Cited in the file of this patent

UNITED STATES PATENTS

| | | |
|---|---|---|
| 2,667,991 | Boyer | Feb. 2, 1954 |
| 2,693,983 | Howell | Nov. 9, 1954 |
| 2,701,163 | Teller et al. | Feb. 1, 1955 |
| 2,721,010 | Meshberg | Oct. 18, 1955 |
| 2,723,005 | Beard Jr. | Nov. 8, 1955 |
| 2,746,796 | St. Germain | May 22, 1956 |
| 2,788,925 | Ward | Apr. 16, 1957 |